March 8, 1955 D. RHEE ET AL 2,703,436
METHOD OF VULCANIZING RUBBER SHEET MATERIAL
Filed April 16, 1953 4 Sheets-Sheet 1

Fig. 1.

INVENTORS
Daniel Rhee and
Donald Cockburn
BY
Burns, Doane, Benedict & Lyons
ATTORNEYS March 8, 1955

D. RHEE ET AL 2,703,436

METHOD OF VULCANIZING RUBBER SHEET MATERIAL

Filed April 16, 1953

INVENTORS
Daniel Rhee and
Donald Cockburn

BY

ATTORNEYS

March 8, 1955  D. RHEE ET AL  2,703,436
METHOD OF VULCANIZING RUBBER SHEET MATERIAL
Filed April 16, 1953  4 Sheets-Sheet 3

INVENTORS
Daniel Rhee and
Donald Cockburn

BY
ATTORNEYS

March 8, 1955     D. RHEE ET AL     2,703,436
METHOD OF VULCANIZING RUBBER SHEET MATERIAL
Filed April 16, 1953     4 Sheets-Sheet 4

INVENTORS
Daniel Rhee and
Donald Cockburn
BY
ATTORNEYS

United States Patent Office 2,703,436
Patented Mar. 8, 1955

2,703,436

METHOD OF VULCANIZING RUBBER SHEET MATERIAL

Daniel Rhee, Rehoboth, Mass., and Donald Cockburn, Warren, R. I., assignors to Rhee Elastic Thread Corporation, Warren, R. I., a corporation of Rhode Island Application April 16, 1953, Serial No. 349,162

20 Claims. (Cl. 18—53)

This invention relates to the vulcanization of sheet rubber. More particularly the invention relates to a method for vulcanizing sheet rubber for the manufacture of rubber thread.

It is of primary importance that vulcanized sheet rubber employed in rubber thread manufacture be substantially uniform in physical and chemical properties. The production of vulcanized sheet rubber of uniform quality, particularly in the substantial lengths, has been a perplexing problem in the art.

Conventional methods for vulcanizing sheet rubber entail forming the sheet rubber into a roll and thereafter applying heat to the outside of the rubber roll. As a result, the outer portions of the sheet rubber roll treated always receive more heat than the interior portions. The vulcanized sheet rubber product obtained is consequently characterized by non-uniform physical properties such as tensile strength, elongation, permanent set, and modulus. Rubber threads cut from sheet rubber vulcanized by methods of the prior art are inherently attended by the same undesirable nonuniformity of physical characteristics.

For many purposes, such as the manufacture of ladies' foundation garments, elastic hosiery, and the like, it is absolutely essential that the rubber thread utilized be of uniform color. The color of vulcanized sheet rubber varies with the amount of heat applied in the vulcanizing process. Conventional methods of vulcanizing sheet rubber result in a product characterized by relatively darker shades in the portions of the sheet rubber receiving the greatest heat. In consequence of the lack of color uniformity in sheet rubber vulcanized by prior art methods, the industry has found it necessary, prior to the cutting of thread therefrom, to dispose of as waste the darker colored ends of the vulcanized rubber sheets.

Additionally, uncured sheet rubber products of conventional rubber calendering operations are normally characterized by rough surfaces, friction holes, and the like, which are collectively referred to in the industry as "calendering defects." The various calendering defects are not eliminated in the sheet rubber vulcanizing processes of the prior art. In consequence of this fact, rubber thread cut from sheet rubber vulcanized by prior art methods may prove defective and unsuitable for many purposes.

Furthermore, prior art methods are unsatisfactory for the vulcanization of sheet rubber in lengths substantially greater than about 500 yards, whereas continuous rubber having lengths in excess of 2,000 yards are in common demand by industry. It has been necessary, in consequence of the limitations of prior art sheet rubber vulcanizing processes, to employ expensive and wasteful thread-splicing equipment to provide rubber threads of lengths requisite to the fulfillment of modern industrial requirements.

It is a primary object of this invention to provide a method for producing vulcanizing sheet rubber of highly uniform physical and chemical properties.

It is a further primary object of the invention to provide a method for producing in lengths substantially in excess of 1,500 or 2,000 yards, vulcanized sheet rubber of requisite uniformity in physical and chemical properties for the manufacture of high quality rubber thread.

It is a specific object of this invention to provide a method for producing vulcanized sheet rubber which is of uniform color throughout substantially the entire area of the vulcanized sheet.

It is a still further object of this invention to provide a method for vulcanizing sheet rubber whereby the various calendering defects of the uncured rubber sheet are substantially entirely eliminated.

It is an additional object of the invention to provide a commercially practical method for vulcanizing sheet rubber which entails dielectrically heating the rubber to the vulcanizing temperature only.

It is yet another object of the invention to provide a method for producing vulcanized sheet rubber of uniform physical and chemical properties which entails the combined application of dielectric heating of the rubber to the vulcanizing temperature while simultaneously and independently raising the temperature of the atmosphere surrounding the rubber.

It is another object of the invention to provide a method for vulcanizing sheet rubber in a high frequency electric field wherein the field is utilized only to raise the temperature of the rubber to the vulcanizing temperature; heating means independent of the electric field being solely utilized to raise the temperature of the surrounding atmosphere and to maintain the rubber at the vulcanizing temperature for the time period requisite to complete the vulcanizing process.

It is an additional object of the invention to provide a method for vulcanizing sheet rubber in the form of a roll of rubber and sheet dielectric material different from uncured rubber, wherein the rubber and sheet dielectric material form alternating layers, the sheet dielectric material being incorporated into the roll under tension.

In accordance with this invention, it has been discovered that the foregoing objects may be achieved by forming a roll of alternating layers of uncured sheet rubber containing vulcanizing agents and a sheet dielectric material different from said uncured rubber, said sheet dielectric material being incorporated into said roll under a tension of at least about 0.10 pound per lineal inch of its width; heating said sheet rubber in said roll to the vulcanizing temperature by positioning said roll in a high frequency electric field, the atmosphere surrounding said roll in said field being simultaneously raised in temperature by heating means independent of said field; ceasing application of said field when the temperature of said rubber has been raised approximately to the vulcanizing temperature, and thereafter utilizing only said independent heating means to maintain said rubber in said roll at said vulcanizing temperature for a time period requisite to achieve vulcanization.

It is critical to the process of this invention that the sheet rubber to be vulcanized be heated dielectrically only to about the vulcanizing temperature. If this critical limitation is not observed, and if the high frequency electric field is applied for a time period substantially longer than that requisite to raise the temperature of the rubber to the vulcanizing temperature, an uneven cure or overcure of the rubber sheet results and a nonuniform product is obtained.

Furthermore, to insure uniform heating of the sheet rubber in the method of this invention, the atmosphere surrounding the rubber sheet dielectric roll should be raised in temperature by independent means, such as steam coils, at approximately the same rate as the sheet rubber is raised in temperature. The rubber is maintained at the vulcanizing temperature after the dielectric heating has been terminated, by heat flowing from the independent heating means only.

In the practice of this invention it is critical that the atmosphere surrounding the sheet rubber be maintained under a pressure of at least about 5, preferably from about 10 to about 15, pounds per square inch. The sheet rubber may be vulcanized in accordance with this invention in an atmosphere of air. It is preferred, however, that an atmosphere of inert gas such as carbon dioxide or nitrogen be utilized to diminish the possibility of arcing, surface oxidation or combustion, and generally to improve the quality of the vulcanized sheet rubber product. It is also desirable to circulate the atmosphere surrounding the rubber during the vulcanizing process to maintain more uniform temperature conditions.

It is essential to the production of vulcanized sheet rubber having uniform physical and chemical properties by the method of this invention, that the sheet rubber be heated in a high frequency electric field in the form of a roll of alternating layers of sheet rubber and tensioned sheet dielectric material different from uncured rubber.

The sheet dielectric material different from uncured rubber functions as a low pressure press and supports the sheet rubber during the heating and vulcanizing process. In the course of the heating and vulcanizing process, the sheet rubber softens and becomes flowable. In the absence of the tensioned sheet dielectric material, the rubber would tend to sag, distort, lose gauge, and otherwise acquire nonuniform physical and chemical properties. In consequence of the presence of the tensioned sheet dielectric material intermediate the rubber layers, the calendering defects of the sheet rubber, including surface roughness, friction holes, and the like, are substantially entirely eliminated.

To the end that the sheet dielectric material may function in the heating and vulcanizing process to prevent distortion and eliminate the calendering defects of the sheet rubber, it is essential that the sheet dielectric material different from uncured rubber be incorporated into the sheet rubber roll under a tension of at least about 0.1, and preferably from about 1 to about 10 lbs. per lineal inch of the width thereof. If this minimum critical tension of the sheet dielectric material in the roll subjected to the vulcanization operation is not observed, the elimination of the calendering defects of the uncured rubber sheet is not completely effected, the rubber sheet is not properly supported during the vulcanizing operation, and a nonuniformly vulcanized sheet rubber product results.

In addition, the sheet dielectric material is present in the uncured sheet rubber roll under tension to eliminate air pockets intermediate the sheet dielectric material and the rubber. The presence of such air pockets could result in over-heating and damage of the adjacent rubber in the dielectric heating step of the invention, and hence give rise to a nonuniform vulcanized sheet rubber product.

In the preferred form of the invention, the power factor and dielectric constant of the sheet dielectric material incorporated into the uncured sheet rubber roll are such that the sheet dielectric material undergoes, in the dielectric heating step, a more rapid rise of temperature than does the rubber to be vulcanized. The rate of temperature rise during the dielectric heating step of the entire roll of sheet dielectric material and uncured sheet rubber is thereby proportionately increased. In consequence of this fact, load matching problems during the dielectric heating step are largely reduced or entirely eliminated.

When the preferred type of sheet dielectric material is employed, heat is imparted by conduction from the sheet dielectric material to the rubber to be vulcanized. Inasmuch as the rubber to be vulcanized is present at all times in the form of a relatively thin layer sandwiched between two layers of different sheet dielectric material, a uniformly vulcanized sheet rubber product is obtained in a relatively shorter period than would otherwise be possible.

It is preferred and in most instances essential, that the sheet dielectric material different from uncured rubber be of substantially the same width as the uncured sheet rubber to be vulcanized. Preferably the sheet dielectric material different from rubber is smooth on both of its opposed surfaces and is characterized by a thickness of not more than about 0.025 inch. Preferably the sheet dielectric material different from uncured rubber has a thickness of from about .001 to about .010 inch. The minimum critical thickness of the dielectric material different from uncured rubber is determined primarily by the requirement that it be of sufficient durability to withstand incorporation into the composite roll under the minimum critical tension of at least about 0.1 lb. per lineal inch of its width.

It will be appreciated by those skilled in the art that the sheet dielectric material different from rubber must be of such a nature that it does not adhere to the rubber to be vulcanized. Nonadherence of the sheet dielectric material to the rubber to be vulcanized can be achieved, inter alia, through the utilization of talc as an interlayer between the sheet dielectric material different from uncured rubber and the uncured rubber per se. Other materials, such as silicones, and the like, can also be so employed.

One preferred form of sheet dielectric material is paper, desirably of the glassine type, i. e. super-calendered or polished sulfite paper. Additional suitable dielectric materials include sheets of synthetic materials such as cellophane (cellulose acetate), cured rubber sheeting, webs of either fabric or paper coated with cured rubber, or synthetic resins such as vinyl chloride and polyethylene, and the like. If desired, the sheet dielectric materials different from rubber may be sprayed with silicones, glucose derivatives, mineral powder such as talc, whiting, and the like, and alcohols to preclude adherence to the rubber to be vulcanized and otherwise to give rise to a more satisfactory product.

It is essential to the production of vulcanized sheet rubber of uniform physical and chemical properties that the high frequency electric field be so applied that heat is generated in a uniform manner throughout the mass of the rubber. In a preferred embodiment of the invention, the uniform application of the high frequency electric field is achieved by rotation of the sheet rubber-sheet dielectric roll within the field, i. e., between the electrodes requisite to the generation of the field. The sheet rubber-sheet dielectric roll is desirably rotated at a speed of at least about 0.25 revolutions per minute. Rotation at a speed of about 1 to about 10 revolutions per minute is preferred. Those skilled in the art will appreciate that appropriate electrode structures may be designed whereby uniform application of the field to the rubber mass may be achieved by means other than rotation of the sheet rubber-sheet dielectric roll.

The high frequency electric field utilized in the method of this invention to generate heat within the rubber mass is preferably of radio frequency. Practical commercial operations are most feasibly carried out through utilization of a high frequency electric field having an intensity requisite to raise the temperature of the rubber to be vulcanized to the desired vulcanizing temperature in a time period not more than about 120 minutes. Utilization of a high frequency electric field of an intensity requisite to raise the temperature of the uncured rubber to the vulcanizing temperature in a time period of not more than about 85 minutes is preferred. A frequency requisite to raise the uncured rubber to the vulcanizing temperature in a time period of from about 70 to 120 minutes is satisfactory. Stated otherwise, the high frequency electric field employed in the process of this invention is desirably characterized by frequencies of at least about one megacycle per second. Practical commercial operations are most feasibly carried out through application of a high frequency electric field having a frequency of from about 1 to about 50 megacycles per second, preferably from about 15 to about 30 megacycles per second.

It is preferable in the production of a vulcanized rubber sheet having uniform physical and chemical properties by the method of this invention that the calendered rubber sheet be incorporated into the roll to be subjected to vulcanizing conditions in a substantially untensioned state. The uncured rubber sheet is reduced to the desired gauge or thickness by the calendering operation. If the calendered rubber sheet is subjected to appreciable tension, the sheet may stretch out of gauge and the vulcanized sheet rubber product ultimately obtained accordingly may be nonuniform in thickness.

In general, for the production of vulcanized sheet rubber to be utilized in thread manufacture, uncured rubber sheet subjected to the heating and vulcanizing operation has a thickness of at least about 0.004 inch. A range of from about 0.004 inch to about 0.10 inch in thickness is common for commercial thread manufacture. The thickness of the rubber sheet vulcanized does not constitute a critical aspect of this invention. Sheet rubber of substantially greater or lesser thickness than that above specified can be vulcanized by the method of this invention.

In a preferred embodiment of the invention, a series of layers of sheet dielectric material, preferably paper, is first wrapped around a metal drum or other suitable support. Preferably from about 2 to about 10 such layers of paper or other sheet dielectric material are first wrapped about the supporting surface. Thereafter, the uncured sheet rubber to be vulcanized and additional sheet dielectric material are simultaneously wrapped to form alternating layers positioned above the aforementioned series of layers of sheet dielectric material only. The sheet composite roll is thereafter completed by wrapping additional layers of sheet dielectric material only about the outer surface thereof and sealing the end of the sheet dielectric material to the roll. Preferably from about 2 to about 10 layers of sheet dielectric material only are wrapped about the outer surface of the roll.

All types of sheet rubber may be vulcanized by the method of this invention. Natural rubber, the various synthetic rubbers such as butadiene-styrene copolymers, chloroprene, butyl rubber, polyacrylonitriles, thiokols, vulcanizable polyesters and the like, may be so vulcanized. It will be appreciated that the particular type of rubber vulcanized is not critical to the invention herein described. Likewise, the various conventional vulcanizing agents may be employed in compounding the rubber sheet material subjected to the vulcanizing process of the invention.

Conventional vulcanizing temperatures are observed in the practice of this invention. It is generally considered that temperatures of about 180° F. to about 300° F. are proper vulcanizing temperatures for most types of rubber. A preferred temperature range is from about 235° F. to about 285° F.

One form of apparatus which may be employed in the practice of the method of this invention is shown in the following drawings, in which.

Figure 1:
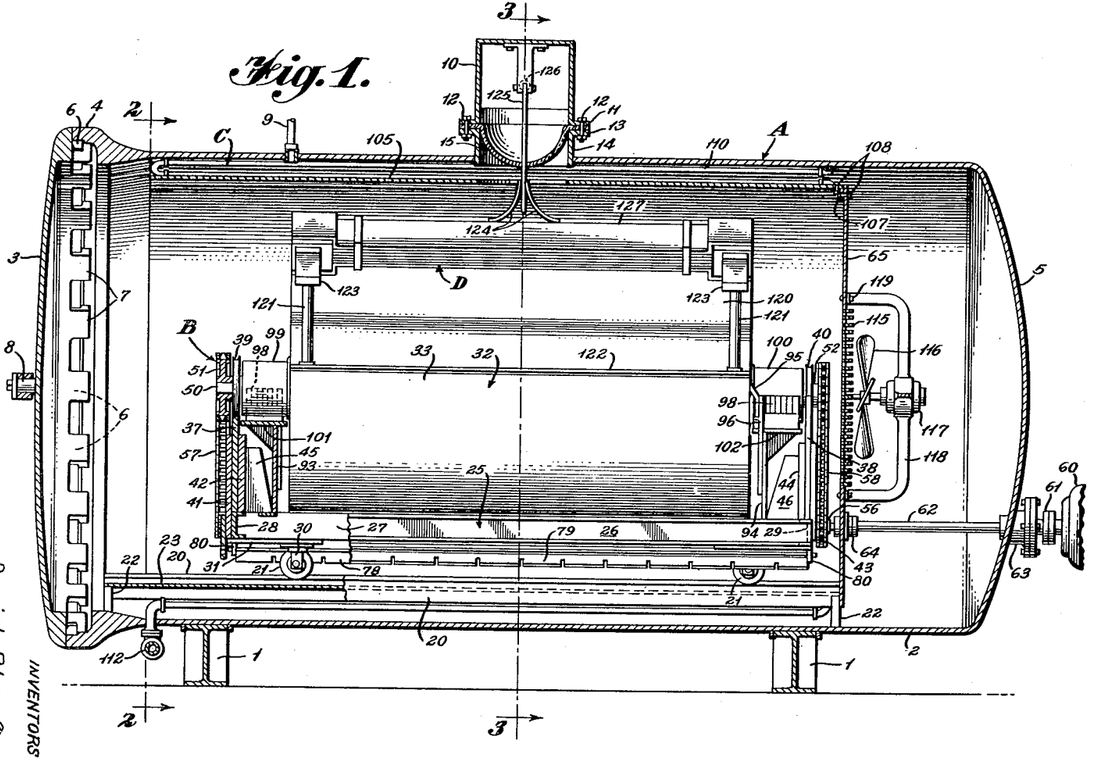
Figure 1 is a longitudinal vertical sectional view of an improved rubber vulcanizing apparatus in which the method of this invention may be practiced.

Referring to Figure 1, wherein the overall rubber vulcanizing apparatus is illustrated, an autoclave A is shown with a load-supporting carriage B positioned therein.

The carriage B is constructed to be moved into and out of the autoclave A on suitable tracks provided therefor, and to support thereon a load of sheet rubber to be vulcanized in the autoclave, as will be described subsequently.

Steam heating means, indicated generally at C, and high frequency dielectric heating means, indicated generally at D, are utilized in combination to effect in the manner hereinafter described the heating and vulcanization of the rubber supported by the carriage B. The specific details of steam heating means C and high frequency dielectric heating means D are described hereinafter.

The operation of the specific embodiment described herein will become apparent from the particular description of the parts thereof which follows. Suffice it to state at this point that the general operation of the apparatus for vulcanizing sheet rubber is as follows:

The carriage B supports the sheet rubber to be vulcanized in the form of a roll. This roll, as will be described subsequently, has a cross-section of alternate layers of the uncured sheet rubber and a separating and supporting sheet dielectric material different from the uncured rubber. The carriage B is rolled into position in the autoclave A, so that the roll of sheet rubber may be externally heated by the steam heating means C which maintains the temperature of the atmosphere within the autoclave at the vulcanizing temperature. In addition, the sheet rubber roll on the carriage B is so positioned in the autoclave A when the carriage is wheeled thereinto, as to be subjected to internal heating created by the high frequency dielectric heating means D. Thus, in the apparatus of this invention, the rubber is vulcanized by internally raising the temperature thereof by means of the high frequency dielectric heating means D while at the same time the surrounding atmosphere within the autoclave A is heated to the vulcanizing temperature by the steam heating means C. After the rubber has reached the particular vulcanizing temperature, the internal heating by the high frequency dielectric heating means is discontinued and the temperature of the rubber is maintained constant at the vulcanizing temperature by the steam heating means C., for a period of time necessary to properly vulcanize the rubber.

The specific and detailed functions of the embodiment illustrated will be more clearly understood from the description which follows:

The autoclave A

The autoclave A, as illustrated in Figures 1 through 4, is horizontally disposed and is suitably supported on members 1, the lower surfaces of which rest on a suitable supporting floor, and the upper surfaces of which engage the lower portion of the outer cylindrical casing 2 of the autoclave.

Figures 4, 5, 6:
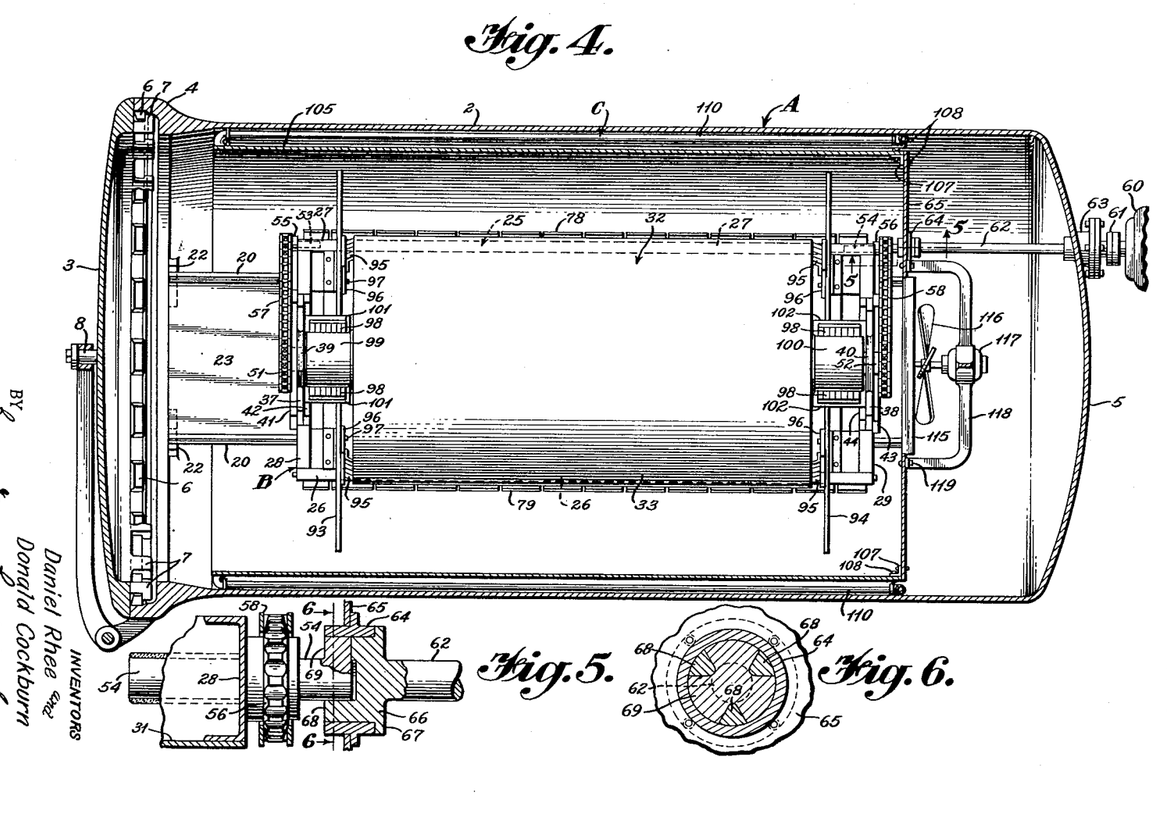
Figure 4 is a horizontal sectional view taken on line 4—4 of Figure 2.
Figure 5 is a detailed sectional view taken on line 5—5 of Figure 4.
Figure 6 is a detailed sectional view taken on line 6—6 of Figure 5.

As illustrated in Figures 1 and 4, a suitable disc-shaped door 3 is provided to close the open end 4 of the autoclave A after the carriage B with the rubber load, has been properly positioned in the autoclave. The opposite end of the autoclave A is closed by an integral domed head 5.

The open end 4 of the autoclave A which may be closed by the disc-shaped door 3 is provided with inwardly projecting teeth 6 spaced around the periphery of the open end 4 which cooperate with similar teeth 7 formed on the periphery of the disc-shaped door 3. This construction permits the outer flange teeth 7 of the door 3 to be moved inwardly past the teeth 6 into the groove in the open end 4 of the autoclave. After so positioning the door, slight rotational movement of the door 3 on its supporting axle 8 will result in the teeth 6 on the autoclave interengaging with the teeth 7 on the door to retain the door on the end 4 of the autoclave and thus enable the interior of the autoclave to be subjected to pressure during the vulcanizing operation.

It has been found desirable to provide an atmosphere of $CO_2$ under pressure within the autoclave during the vulcanizing operation to reduce the possibility of arcing between the electrodes of the high frequency dielectric heating means and to preclude blow holes and other defects from developing on the rubber during the vulcanizing process. A suitable pipe 9, connected to the top of the autoclave A, is provided for this purpose.

There is also provided a high tension housing 10 at the top of the autoclave A. A flange 11 on housing 10 is secured by suitable bolts 12 to the flange 13 of the connecting conduit 14. The rim of the porcelain dished insulator 15 is bolted between the flanges 11 and 13 to serve as a centering means for the high frequency conductor within conduit 14 extending radially from the autoclave casing 2. The high tension housing 10 and the insulator 15 are described in detail hereinafter with the description of the dielectric heating means.

The carriage B

Figure 3:
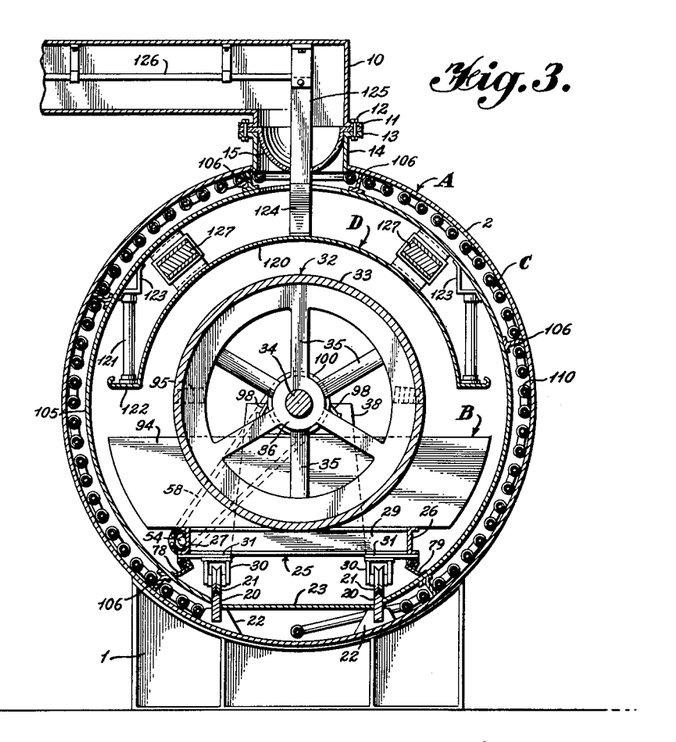
Figure 3 is a transverse sectional view taken on line 3—3 of Figure 1.

As shown most clearly in Figure 3, rails 20, to cooperate with the grooved wheels 21 on the load-supporting carriage B are appropriately provided inside the bottom of the outer casing 2 of the autoclave A. Rails 20 may suitably be welded to supports 22, which in turn are secured, as by welding, to the inner surface of the casing 2. The rails 20 extend parallel to each other and longitudinally of the casing 2 of the autoclave A. A plate 23 is connected between the rails 20 and likewise is secured on the supports 22. The plate 23 separates the interior of the autoclave wherein the rubber load is positioned from an annular space in which the steam heating means C is positioned, as will be described in detail later.

The load-supporting carriage B, illustrated in the embodiment shown in Figures 1 through 4, comprises a channel iron frame indicated generally at 25, made up of side members 26 and 27 and end members 28 and 29. To the bottom of this frame there are secured four grooved wheels 21 which are suitably journaled in bearing supports 30 rigidly secured to the under side of the frame, as by plates 31. These wheels 21 are spaced on the frame 25 so as to cooperate with the rails 20, thus enabling the carriage B to be rolled into the autoclave on rails 20 for the vulcanization of the rubber carried by the carriage.

The carriage B rotatably supports a cylinder 32 on which the sheet rubber to be vulcanized is wound and which serves as an electrode of the dielectric heating means as will be explained hereinafter. This cylinder 32 has an outer cylindrical wall 33 supported on a center axle 34 by a plurality of radially extending braces 35 which join the outer cylindrical wall 33 with the hub 36 on the center axle 34. The radial braces 35 which support the wall 33 on the center axle 34 radiate at equal angles from the hub 36. To secure the desired uniform heating of the rubber load by the dielectric heating means D, the uniform spacing of the braces 35 has been found to be important. These braces radiate in the plane of each of the ends of cylinder 32 and also in planes spaced equidistant along the length of the cylinder. Three radial braces, 120° apart, extend from the hub 36 to the wall 33 in each transverse plane of a set of braces while the three braces of the adjacent set radiate at 120° angles spaced 60° from the adjacent set. Thus, although in Figures 2 and 3 it appears that the braces 35 radiate at 60° angles, actually three braces extend 120° apart in one plane while an adjacent set of braces likewise extend 120° apart in another transverse plane but spaced 60° from the radii of the adjacent set of three braces.

Axle 34 is supported at the opposite ends of the carriage by support plates 37 and 38 respectively. Each of the plates 37 and 38 has a semi-circular saddle at the upper end thereof. Bearings 39 and 40 are positioned in the respective semi-circular saddles and the opposite ends of the axle 34 are journaled in the bearings. These support plates 37 and 38 are vertically mounted on the channel frame 25 of the carriage by plates 41 and 42 in the case of support plate 37 and plates 43 and 44 in the case of support plate 38. To provide additional support for the plates 42 and 44, buttressing brace members 45 and 46, respectively, are secured to the carriage frame and to the respective plates 42 and 44.

Thus it will be seen that the cylinder 32 is supported at the opposite ends thereof for rotation on the carriage B. Rotation of the cylinder 32 helps to secure uniform heating and vulcanization of the sheet rubber applied around the cylinder 32.

Suitable drive means may be provided to the end that the aforementioned rotation may be effected. To accomplish this rotation, the opposite ends of the axle 34 outwardly of the bearings 39 and 40 are squared, as shown at 50. Driving sprockets 51 and 52 are provided at the opposite squared ends, respectively, of the axle 34. Each of the sprockets 51 and 52 has a squared center aperture to cooperate with the squared ends 50 of the axle.

Stud shafts 53 and 54 are journaled in suitable bearing means secured to the side member 27 at the lower side of the channel frame 25 of the carriage B. The stub shafts 53 and 54 support on the outer ends thereof sprockets 55 and 56. A driving chain 57 extends between and around the sprocket 51 and sprocket 55. A similar driving chain 58 extends between and around the sprocket 52 and sprocket 56.

A suitable driving motor 60 is positioned externally of the casing of the autoclave A adjacent the domed head 5, as shown in Figures 1 and 4. The shaft of this motor is coupled by a suitable flanged coupling 61 to a driving shaft 62 extending through the domed head 5 of the autoclave in axial alignment with the stub shaft 54. A flanged bearing and seal 63 is provided in the domed head 5 to rotatably support the shaft 62 and seal the shaft against leakage of the pressurized atmosphere within the autoclave to the surrounding atmosphere. At the inner end of the shaft 62 a bearing 64 is provided, mounted in a transverse wall 65. This transverse wall is pertinent to the operation of the steam heating means, as will be described in detail hereinafter.

As shown most clearly in Figures 5 and 6, the bearing 64 for the inner end of shaft 62 is suitably welded or bolted to the transverse wall 65. Shaft 62 is provided with an enlarged end 66 which extends into the opening of the bearing 64 and is provided with a flange 67 which engages the edge of the opening in the bearing 64. The portion of the enlarged end 66 extending toward the space in the autoclave occupied by the load-supporting carriage B is provided with driving lugs 68 integral therewith. On the outer end of stub shaft 54 to which sprocket 56 is secured for rotation, a notched flange 69 is provided to cooperate with the driving lugs 68 integral with the enlarged end 66 on shaft 62.

From the structure described above, it will be seen that rotation of the shaft of the motor 60 will transmit through coupling 61, shaft 62, driving lugs 68, flange 69, shaft 54, sprocket 56, drive chain 58, and drive sprocket 52, a rotative force to turn the cylinder 32 on the carriage B when such carriage is properly positioned in the autoclave. In operation, the carriage B is rolled into the autoclave A on the parallel rails 20 until the flange 69 properly engages with the driving lugs 68. Then energization of the driving motor 60 will rotate the cylinder 32 on the autoclave carriage. It will be understood that the particular driving means herein described is illustrative merely. Any suitable driving means may be used whereby the cylinder 32 on the carriage B may be rotated.

It will be noted that identical driving sprockets, chains and sprockets have been provided at opposite ends of the autoclave carriage. It has been discovered that when a dielectric heating means is used in the vulcanization of rubber, it is important that the carriage be provided with balanced or equal mass distribution to secure uniform dielectric heating. Accordingly, the driving sprockets, chains and sprockets are provided at both ends of the autoclave carriage as a simple expedient in securing balanced mass distribution. This prevents unequal dielectric heating which might be caused by providing the metallic mass of a driving means at only one end of the autoclave carriage.

In the specific embodiment of the invention illustrated on the drawings, it will be noted that the autoclave carriage supports, as an element thereof, one of the electrodes used in the dielectric heating of the rubber sheet carried by the carriage. This electrode consists of cylinder 32 together with its related parts. Thus, cylinder 32 is the lower electrode of the dielectric heating means and is positioned on the carriage B with the outer surface spaced from the upper electrode mounted in the autoclave as will be described hereinafter.

Since the cylinder 32 on the carriage B is to serve as one of the electrodes for the dielectric heating means D, means must be provided to couple this electrode with the source of high frequency power used in the dielectric heating means. To this end, a pair of grounding flaps 78 and 79 are secured along the opposite sides of the carriage B. These grounding flaps are mounted on the carriage so as to be movable outwardly into contact with the structure of autoclave A when the carriage is properly positioned within the autoclave for vulcanization of the rubber load.

Each of the grounding flaps 78 and 79 is constructed of a length substantially equal to the length of the carriage B with the opposite ends thereof pivotally mounted in supporting journals 80 secured to the underside of plates 31 which mount the bearing supports 30 for grooved wheels 21. These supporting journals 80, at the ends of the grounding flaps 78 and 79, permit the flaps to be pivoted upwardly away from the autoclave structure during insertion into and removal of the carriage B from the autoclave A. Once the carriage B is properly positioned within the autoclave, the flaps 78 and 79 are pivoted downwardly to firmly contact the autoclave structure and thereby connect the carriage to be at the same potential as the autoclave A.

Also, since cylinder 32 acts as one electrode in the dielectric heating means of this invention, it is important to maintain the cylinder 32 and its associated parts electrically connected to the rest of the carriage so as to be at the same electrical potential as the other parts of the carriage. To accomplish this, brushes are provided at the opposite ends of the carriage B to ground the rotating members to the carriage and thence through the grounding flaps 78 and 79 to the autoclave structure.

In connecting the outer cylindrical wall 33 of the cylinder 32 to ground, a plurality of brushes 95 are mounted on the transverse plates 93 and 94 by suitable plates 96. Brush holding plates 96 are secured to the transverse plates 93 and 94 by nut and bolt connectors 97. As best shown in Figure 4, it will be noted that four sets of brushes 95 are positioned to engage the ends of the wall 33 of cylinder 32, two of these sets of brushes being positioned at each end of the cylinder and engaging diametrically opposite points on the peripheral edge of the wall 33.

In addition to the grounding brushes 95 for the outer wall 33 of the cylinder 32, two additional sets of grounding brushes 98 are provided for the center axle 34 of cylinder 32. Brushes 98 are positioned to engage drums 99 and 100 mounted on the ends of the axle 34. The brushes 98 engaging the outer surfaces of drums 99 and 100 are mounted on the transverse plates 93 and 94 by horizontal plates 101 and 102 secured to the transverse plates 93 and 94, respectively.

From the above described structure it will be apparent that the brushes 95 and 98 serve to ground the rotatable cylinder 32 and its axle 34 to the autoclave carriage. Further, the grounding flaps 78 and 79 provide a means for connecting the rotatable cylinder 32 to ground potential by contacting the autoclave structure when the carriage has been properly positioned for vulcanization of the rubber load in the autoclave.

It is further pointed out that these grounding flaps 78 and 79, by extending throughout the entire length of the autoclave carriage, provide an efficient ground for the entire carriage structure and thereby insure that the cylinder 32 will be maintained at ground potential to act as one of the electrodes in the dielectric heating means D.

*The steam heating means C*

A separating sheet 105 extends concentric to the casing 2 of the autoclave A. Sheet 105 extends parallel to the casing 2 from one side of one rail 20 around the interior of the autoclave to the side of the opposite rail 20. The positioning of this sheet in the autoclave provides an annular space between casing 2 and sheet 105 for steam heating coils 110 of the steam heating means C. The dividing plate 23 extending between the parallel rails 20 completes this annular space which extends throughout a major portion of the length of the autoclave. The sheet 105 is suitably secured in spaced relation to the casing 2 by spacing members 106. Spacing members 106 are welded to the interior of casing 2 and the exterior of the separating sheet 105. The end of sheet 105 is secured to the transverse wall 65 toward the rear of the autoclave by angle members 107 and rivets 108 connecting the legs of the angle members to the respective abutting edges of sheet 105 and transverse wall 65.

Figure 2:
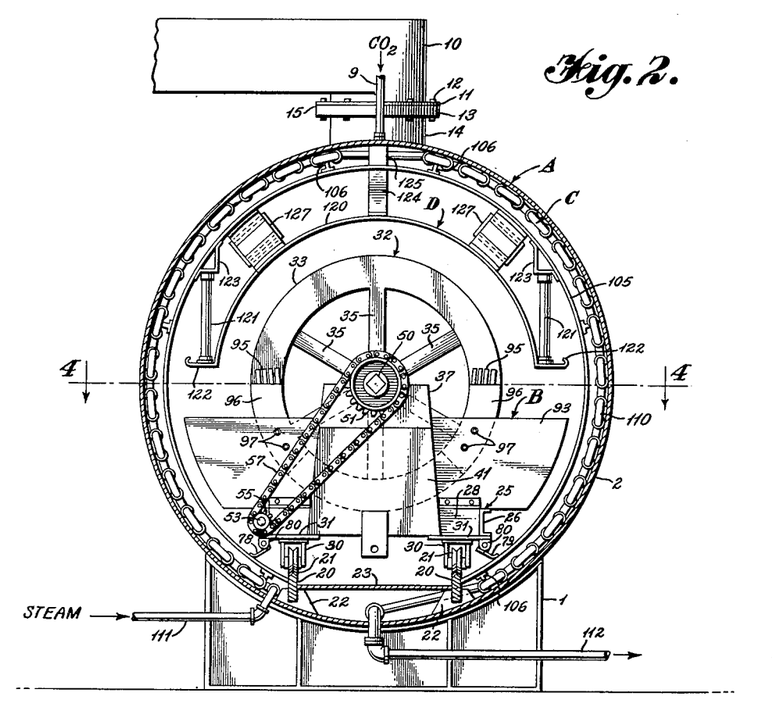
Figure 2 is a transverse sectional view taken on line 2—2 of Figure 1.

In vulcanizing rubber with the herein disclosed apparatus, the atmosphere within the autoclave surrounding the sheet rubber supported on cylinder 32 is suitably raised to the vulcanizing temperature by steam coils 110 positioned in the annular space between the separating sheet 105 and casing 2, as shown specifically in Figure 2. A steam inlet pipe 111 is connected to one end of the coils 110 and a steam or condensate drain 112 connected to the opposite end of the coils, so that steam may be applied to the heating coils to obtain the desired temperature of the atmosphere within the autoclave.

The coils 110 are made up of a plurality of lengths of conduit extending longitudinally within the annular space, with the ends of adjacent conduits being connected by U couplings. Thus the steam in entering through pipe 111 passes back and forth within the conduits to heat the atmosphere within the annular space between the separating sheet 105 and casing 2, until the steam condenses or is bled off through the outlet 112.

An opening, shown best in Figure 1, is provided in the transverse wall 65 for circulation of the atmosphere within the autoclave to facilitate uniform heating thereof by steam heating means C. This opening, as shown in the drawings, is provided with flow-directing louvers 115 to provide a more uniform flow of heated gases across the rubber to be vulcanized on the carriage.

To secure forced circulation of the gases within the autoclave, a fan 116 having a suitable electric motor 117, is mounted on a supporting bracket 118 secured as by bolts or rivets 119 to the transverse wall 65. This fan 116 is positioned to direct the flow of heated gases through the louvers 115 across the rubber supported on the cylinder 32 of the carriage B. A forced circulation of gases is thereby produced to effect uniform temperature conditions within the autoclave.

*The high frequency dielectric heating means D*

High frequency dielectric heating of a dielectric material such as rubber is accomplished by disposing the dielectric material between electrodes and thereafter applying a high frequency voltage across the two electrodes. The application of the high frequency to the electrodes sets up an electrostatic field between the electrodes which develops heat within this material.

The cylinder 32 and associated parts which, in the apparatus shown in the drawings, forms part of the carriage B, serves as the grounded or cold electrode of the dielectric heating means utilized in the apparatus of this invention. Positioned within the autoclave A, above and opposite the cylinder, there is provided an electrode 120. This electrode serves as the hot or high tension electrode for the dielectric heating means. As shown in the embodiment illustrated, this electrode 120 is rigidly supported within the autoclave by insulating rods 121 secured to the flanges 122 of the upper electrode 120. The upper ends of these insulating rods 121 are secured to brackets 123 mounted on the inner surface of the separating sheet 105. Thus the electrode 120 is positioned to extend parallel to and concentric with the surface of the cylinder 32 when the autoclave carriage is positioned for vulcanization of the rubber load.

To apply the high frequency voltage to the cooperating electrodes the midpoint of the electrode 120 is engaged by conductors 124 connected to the lower end of a conductor bar 125. The conductor bar extends outwardly through conduit 14 and dished insulator 15 to housing 10 where it connects with high frequency lead-in wire 126. Within the housing 10 and insulated therefrom the high frequency lead-in wire 126 extends to a suitable high frequency generator or oscillator (not shown).

The return or high frequency ground for the apparatus is suitably provided by the conduit 14 and housing 10 so that the high frequency voltage is applied across the opposite electrodes 120 and cylinder 32 to produce the high frequency dielectric heating of the dielectric material supported on the cylinder 32.

To enable the dielectric heating means D to be tuned with respect to resonance with the frequency of the voltage of the high frequency generator, suitable tuning stubs 127 are interposed between the electrode 120 and the separating sheet 105. Tuning stubs 127 are preferably adjusted to the load and set when the apparatus is initially constructed so that the heating means will be properly tuned for the frequency of the voltage of the generator.

*Positioning of sheet rubber for vulcanization*

Figure 7:
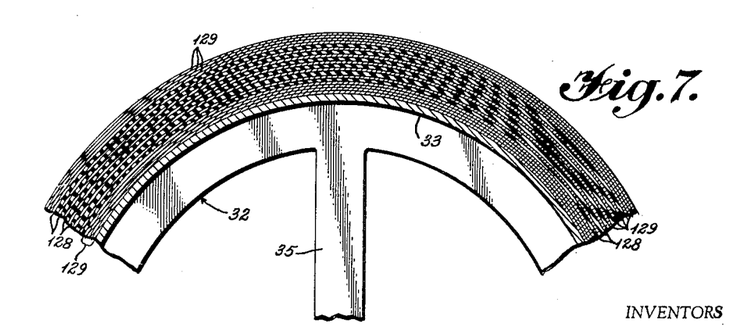
Figure 7 is a sectional view of a portion of the end of the rubber supporting cylinder with the load to be vulcanized positioned thereon.
Figure 8:
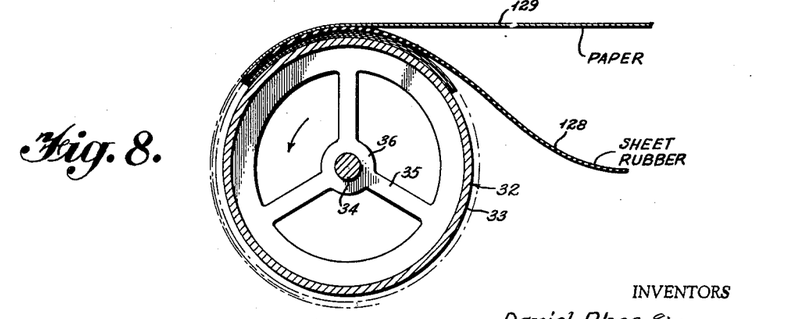
Figure 8 is a transverse sectional view of the rubber supporting cylinder illustrating the manner in which the rubber load to be vulcanized and the sheet dielectric material are applied to the supporting cylinder.

Referring specifically to Figures 7 and 8, there is shown the arrangement utilized in wrapping the rubber to be vulcanized on the cylinder 32. Figure 7 shows the calendered rubber sheet 128 wrapped around the cylinder 32 with a plurality of turns of paper 129, preferably glassine paper, initially wrapped around the cylinder 32 and then the rubber sheet and paper interleaved and wrapped to the desired thickness of rubber sheet to be vulcanized. After sufficient rubber has been applied, interleaved with paper, to the cylinder 32, several additional layers of paper are wrapped around the outside of the mass to complete the rubber load to be vulcanized. Figure 8 illustrates the manner in which this paper and sheet rubber are interleaved and rolled on to the cylinder 32.

At the high temperatures needed to vulcanize sheet rubber, the rubber would sag away from the cylinder 32 were not some support provided to retain the calendered rubber sheet in position. The glassine paper as it is wrapped around the cylinder 32 is tensioned, as shown in Figure 8, to provide the necessary support for the calendered rubber sheet while the sheet rubber is fed into the cylinder 32 slack. The tensioned feeding of the paper thus assists in correcting and removing the calendering defects such as rough surfaces and friction holes from the sheet rubber during the vulcanization thereof by acting as a low pressure press on the calendered sheet rubber.

Preferred methods of presenting the method of this invention in the above described apparatus are set forth in the following examples, in which all parts are by weight unless otherwise indicated.

EXAMPLE 1

South American crude rubber was compounded with vulcanizing agents in conventional manner, and calendered into a sheet approximately 0.008 inch in thickness and approximately 5 feet in width. The compounding formula was as follows:

| Ingredients: | Parts by weight |
|---|---|
| Wild pará rubber | 100 |
| Sulfur | 7 |
| Sym. dibeta naphthyl pará phenylene diamine | 1 |

About the outer surface 33 of the cylinder 32, six layers of glassine paper were wrapped, in the manner shown best in Figures 7 and 8. The glassine paper utilized extended about ½ inch on either side of the rubber and was approximately 0.0015 inch in thickness.

The calendered sheet rubber containing vulcanizing agents, as above described, was then incorporated into the roll in conjunction with additional paper in such a manner as to form alternating layers of rubber and paper about the roll. The rubber was incorporated into the roll slack and the paper was wrapped about the roll under a tension of about 1 lb. per lineal inch of its width (see Figure 8). The wrapping of the paper and rubber about the outer surface 33 of the cylinder 32 was continued in the manner above described until approximately 2500 yards of the rubber had been incorporated into the roll. After completion of incorporation of the sheet rubber into the roll, six additional layers of glassine paper were wrapped about the outer surface of the roll and the end of the paper was sealed to the roll with Scotch tape. In Figure 7 is shown a cross-sectional view schematically representing the nature of the finished rubber-paper roll.

The carriage B was then rolled into the autoclave A on the rails 20 in a position such that the flange 69 engaged the driving lugs 68 whereby the cylinder 32 and the associated load might be rotated within the autoclave by operation of the motor 60. The door 3 of the autoclave A was then closed and secured.

Air, under a pressure of about 10 to about 15 lbs. per square inch gauge was then introduced into the autoclave.

An alternating electric field having a frequency of about 21 megacycles was then applied to the sheet rubber-sheet dielectric load within the autoclave. The intensity of the field was such to raise the temperature of the rubber to approximately 240° F. in approximately 90 minutes.

Simultaneously, steam was introduced into the steam heating means C in a manner requisite to raise the temperature of the atmosphere surrounding the sheet rubber-sheet dielectric roll at substantially the same rate as the temperature of the rubber was raised as a result of the action of the electrostatic field. Simultaneously with the application of the electrostatic field and the initiation of the steam heating means, rotation of the cylinder 32 was started at a rate of approximately 1.5 revolutions per minute. Also, simultaneously with the application of the dielectric and steam heating, circulation of the atmosphere within the autoclave was initiated by actuation of the fan 116.

After a period of about 90 minutes, when the rubber supported by the cylinder 32 had reached the vulcanizing temperature of approximately 300° F., the application of the high frequency field was terminated and the rubber maintained at the vulcanizing temperature of about 300° F. by means of heat flowing from the steam heating coils C only. The vulcanization of the rubber was completed in this manner in about 75 additional minutes.

Upon completion of the vulcanization of the rubber, the door 3 of the autoclave was opened and the carriage B rolled out of the autoclave. The sheet rubber carried by the cylinder 32 was rapidly removed therefrom and cooled on cooling rollers, with simultaneous application of talc in conventional manner. As an alternative to the use of talc, the sheet rubber may be supplied with a solution of a silane such as octadecyl or hexadecyl trichlorosilane which has from about 7 to about 20 carbon atoms in the alkyl group. Such silanes form a silicone coating upon the hot rubber surface and function in the same manner as talc.

The vulcanized sheet rubber product so obtained was uniform substantially in its entirety in both physical and chemical properties. The vulcanized sheet rubber product was free of surface defects and of uniform color throughout its area. The product was suitable in its entirety for use in the manufacture of rubber thread.

EXAMPLE 2

Example 1 was repeated with the exception that in this instance air within the autoclave was displaced by carbon dioxide introduced into the autoclave through the means provided therefor as shown in Figure 2. Adequate carbon dioxide was introduced by this means to establish a carbon dioxide pressure of about 10 lbs. per square inch gauge within the autoclave during the vulcanizing operation.

The carbon dioxide served to diminish the possibility of undesirable oxidation and combustion during the application of the electrostatic field and by exertion of pressure.

The product obtained was analogous in quality to that of Example 1, but characterized by superior color.

EXAMPLE 3

The process of Example 2 was repeated with the exception that sheet rubber approximately 0.055 inch in thickness was utilized.

The product was analogous in quality to that of Example 2.

EXAMPLE 4

The method of Example 2 was repeated with the exception that Ceylon crepe rubber was utilized. The compounding formula employed in the formation of the calendered rubber sheet to be vulcanized was as follows:

| Ingredients: | Parts by weight |
|---|---|
| Ceylon crepe rubber | 100.00 |
| Mercapto benzothiozol | 1.00 |
| 4 methyl 6 tertiary butyl phenol | 1.00 |
| Stearic acid | 0.25 |
| Zinc oxide | 5.00 |
| Titanium dioxide | 4.00 |
| Sulfur | 2.00 |

In this example the sheet rubber was calendered to a thickness of about 0.004 inch prior to vulcanization. Likewise, the sheet rubber was maintained at the vulcanizing temperature of about 300° F. for only about 45 minutes after the dielectric heating was terminated.

The vulcanized sheet rubber product obtained was characterized by the same high degree of physical and chemical uniformity as characterized the product of Example 2.

EXAMPLE 5

The method of Example 4 was repeated with the exception that the glassine paper was incorporated into the rubber-paper roll wrapped about the cylinder 32 of the carriage B under a tension of about 0.1 lbs. per inch of the lineal width of the paper.

A product analogous to that obtained in Example 2 was produced.

EXAMPLE 6

Example 2 was repeated with the exception that a synthetic rubber known to the art as chloroprene, a polymer of 2-chloro-13-butadiene, was formed to form the calendered uncured rubber sheet to be vulcanized. The compounding formula utilized in this example was as follows:

| Ingredients: | Parts by weight |
|---|---|
| Chloroprene | 100.00 |
| 4 methyl 6 tertiary butyl phenol | 1.00 |
| Light calcined magnesium oxide | 4.00 |
| Stearic acid | 3.00 |
| Light oil | 2.00 |
| Titanium dioxide | 5.00 |
| Zinc oxide | 5.00 |

In this example the rubber to be vulcanized was maintained at the curing temperature of about 300° F. for about 60 minutes, after the dielectric heating was terminated.

The vulcanized synthetic rubber product obtained was characterized by the same uniformity of physical and chemical properties as characterized the product of Example 2.

EXAMPLE 7

Example 2 was repeated with the exception that in this instance a cloth fabric coated with vulcanized rubber was utilized in lieu of glassine paper as the sheet dielectric material different from uncured rubber. This rubber-coated cloth was approximately .02 inch in thickness and was incorporated into the uncured sheet rubber roll under a tension of about 10 lbs. per lineal inch of its width.

A product similar in properties to that described in Example 2 was obtained.

EXAMPLE 8

Example 2 was repeated with the exception that in this instance the crude rubber employed was crude smoked sheet from Singapore. The compounding formula utilized in the production of the uncured rubber sheet was as follows:

| Ingredients: | Parts by weight |
|---|---|
| Smoked sheet | 100.00 |
| Sulfur | 7.00 |

In this example the rubber was maintained at the curing temperature of about 300° F. for about 70 minutes, after the termination of the dielectric heating.

A product similar in properties to that obtained in Example 2 was produced.

While the examples hereinbefore described have dealt with the utilization of sheet dielectric materials having smooth opposed surfaces, it is within the purview of this invention to utilize sheet dielectric materials different from rubber having contoured designs, whereby there may be produced a vulcanized sheet rubber product having a desired corresponding design. Such a product finds little utility for the production of rubber thread, but is highly useful for other purposes familiar to the art.

Reference is made to the copending application of Rhee and Cockburn, Serial No. 347,731, filed April 9, 1953, and entitled "Apparatus for Vulcanizing Rubber Thread."

By virtue of this invention, there is provided for the first time a commercially successful method of vulcanizing sheet rubber to produce a product of a quality suitable in its entirety for the manufacture of rubber thread. Additionally, this invention represents the first commercially feasible process which has been developed for the vulcanization of sheet rubber through the application of dielectrically generated heat in the rubber. The invention, accordingly, represents a significant contribution to the art.

What is claimed is:

1. The process which comprises forming a roll of alternating layers of uncured sheet rubber containing vulcanizing agents and a sheet dielectric material different from said rubber, said sheet dielectric material being incorporated into said roll under a tension of at least 0.1 pound per lineal inch of its width; dielectrically heating the uncured rubber in said roll to the vulcanizing temperature by positioning said roll in a high frequency electric field, the atmosphere surrounding said roll being maintained at a pressure of at least about 5 pounds per square inch and being raised in temperature simultaneously with said rubber by heating means independent of said field; terminating said dielectric heating when the temperature of said rubber has been raised approximately to the vulcanizing temperature, and thereafter utilizing only said independent heating means to maintain said rubber in said roll at said vulcanizing temperature for a time period requisite to achieve vulcanization.

2. The process of claim 1, wherein the atmosphere surrounding said roll is an inert gas.

3. The method of claim 1, wherein said roll is rotated during the dielectric heating step.

4. The method of claim 3 wherein said roll is rotated at a speed of from about 1 to about 10 revolutions per minute.

5. The method of claim 1, wherein rubber is vulcanized at a temperature of from about 230° F. to about 260° F.

6. The method of claim 1 wherein the high frequency electric field is of an intensity requisite to raise the temperature of the rubber to be vulcanized to the vulcanizing temperature in a time period of from about 70 minutes to about 120 minutes.

7. The method of claim 1 wherein the sheet dielectric material other than uncured rubber is paper.

8. The method of claim 7 wherein the paper is glassine paper.

9. The method of claim 1 wherein the sheet dielectric material other than rubber is incorporated into said roll at a tension of from about 1 pound to about 10 pounds per lineal inch of the width thereof.

10. The method of claim 1 wherein the sheet rubber to be vulcanized has a thickness of at least about 0.004 inch.

11. The method of claim 1 wherein the atmosphere surrounding said roll is circulated during the vulcanizing process.

12. The method of claim 1 wherein the atmosphere surrounding said roll is raised in temperature by said independent heating means at approximately the same rate said uncured sheet rubber is raised in temperature by said high frequency electric field.

13. The method of claim 1 wherein the roll of uncured sheet rubber and sheet dielectric material different from uncured rubber is formed about a cylindrical metal base.

14. The process of claim 13 wherein the sheet dielectric material different from uncured rubber comprises paper.

15. The process of claim 13 wherein the atmosphere surrounding roll of uncured sheet rubber and sheet dielectric material different from rubber is an inert gas.

16. The process of claim 13 wherein the sheet rubber is incorporated into the roll of uncured sheet rubber and sheet dielectric material different from rubber in a substantially untensioned state.

17. The process which comprises forming a roll of alternating layers of uncured sheet rubber containing vulcanizing agents and glassine paper, said paper being incorporated into said roll under a tension of from about 1 to 10 lbs. per lineal inch of its width, dielectrically heating the uncured rubber in said roll to the vulcanizing temperature by positioning said roll in a high frequency electric field, the atmosphere surrounding said roll being raised in temperature by independent heating means at approximately the same rate as said rubber is raised in temperature by said dielectric heating, said atmosphere being maintained at a pressure of from about 10 to about 15 lbs. per square inch, terminating said dielectric heating when the temperature of said rubber has been raised approximately to the vulcanizing temperature and thereafter utilizing solely said independent heating means to maintain said rubber in said roll at the vulcanizing temperature for a time period requisite to achieve vulcanization.

18. The method of claim 17 wherein the atmosphere surrounding the roll of uncured rubber and glassine paper is an inert gas.

19. The method of claim 17, wherein the roll of uncured rubber and glassine paper is rotated during the dielectric heating step.

20. The process of claim 17, wherein the rubber to be vulcanized is natural rubber.

References Cited in the file of this patent

UNITED STATES PATENTS

| Re. 22,188 | Minor | Sept. 29, 1942 |
| 676,350 | Bourn | June 11, 1901 |
| 1,237,554 | Price | Aug. 21, 1917 |
| 2,260,710 | Gschwind | Oct. 28, 1941 |
| 2,310,619 | Dillehay | Feb. 9, 1943 |
| 2,485,072 | Shields | Oct. 18, 1949 |
| 2,637,876 | Cory | May 12, 1953 |